United States Patent
Prakah-Asante et al.

(10) Patent No.: US 9,230,443 B2
(45) Date of Patent: Jan. 5, 2016

(54) METHOD AND SYSTEM FOR PREDICTIVE VEHICLE SYSTEMS PERFORMANCE SELECTION FOR ENHANCED MANEUVERABILITY

(71) Applicant: Ford Global Technologies, LLC, Dearborn, MI (US)

(72) Inventors: Kwaku O. Prakah-Asante, Commerce Township, MI (US); Jianbo Lu, Northville, MI (US); Finn Tseng, Ann Arbor, MI (US); Dimitar Petrov Filev, Novi, MI (US); Steven Joseph Szwabowski, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 13/847,070

(22) Filed: Mar. 19, 2013

(65) Prior Publication Data

US 2014/0288775 A1    Sep. 25, 2014

(51) Int. Cl.
*G08G 1/16*    (2006.01)
*G01S 13/93*    (2006.01)

(52) U.S. Cl.
CPC .............. *G08G 1/166* (2013.01); *G01S 13/931* (2013.01)

(58) Field of Classification Search
None
See application file for complete search history.

(56) References Cited

U.S. PATENT DOCUMENTS

| | | | | |
|---|---|---|---|---|
| 5,166,681 A * | 11/1992 | Bottesch et al. | ............... | 340/933 |
| 5,632,503 A | 5/1997 | Raad et al. | | |
| 5,865,265 A * | 2/1999 | Matsumoto | .................... | 180/169 |
| 7,269,485 B2 * | 9/2007 | Oikawa et al. | ..................... | 701/1 |
| 7,403,842 B2 * | 7/2008 | Yamamura et al. | ............... | 701/1 |
| 7,710,248 B2 * | 5/2010 | Greene et al. | ................. | 340/436 |
| 8,700,251 B1 * | 4/2014 | Zhu et al. | ......................... | 701/25 |
| 8,849,515 B2 * | 9/2014 | Moshchuk et al. | ............. | 701/42 |
| 2007/0188168 A1* | 8/2007 | Stanley et al. | ................. | 324/228 |
| 2010/0209882 A1 | 8/2010 | Lin et al. | | |
| 2010/0292894 A1 | 11/2010 | Essaili et al. | | |
| 2012/0239253 A1* | 9/2012 | Schmidt et al. | .................. | 701/41 |
| 2013/0151058 A1* | 6/2013 | Zagorski et al. | ................ | 701/23 |
| 2013/0253756 A1* | 9/2013 | Matsuno | ...................... | 701/29.2 |

* cited by examiner

Primary Examiner — Nicholas Kiswanto
(74) Attorney, Agent, or Firm — LeClairRyan

(57) ABSTRACT

A predictive enhanced maneuverability system providing enhanced timely delivery of vehicle performance selection of chassis, and steering modes for potential predicted safety collisions is disclosed. The primary inputs of the disclosed invention include a determination of the proximity to a preceding vehicle, the density of the surrounding traffic, a forward collision warning alert, and the predictive enhanced maneuverability decision sub-system for vehicle mode selection. The system of the disclosed invention provides a customized vehicle dynamics chassis and steering dynamic mode output, based on a predicted decision about vehicle potential for collision, for improved driver maneuverability and safety. In addition, the disclosed invention provides an improved system and method for incorporating the time dependent headway, forward collision warning alert, and the traffic density for chassis collision-mode embedded decision-making. The predictive enhanced maneuverability decision-module allows vehicle dynamics mode selection to be tailored based on proximity to a potential collision.

19 Claims, 5 Drawing Sheets

METHOD AND SYSTEM FOR PREDICTIVE VEHICLE SYSTEMS PERFORMANCE SELECTION FOR ENHANCED MANEUVERABILITY

TECHNICAL FIELD

The disclosed invention relates generally to adaptive systems for automotive vehicles. More particularly, the disclosed invention relates to a predictive enhanced maneuverability arrangement that provides timely delivery of vehicle performance selection between chassis and steering modes for potential predicted safety collisions.

BACKGROUND OF THE INVENTION

Automotive technology capable of delivering automatic vehicle mode adaptation based on the driver, the vehicle, and environmental conditions is a developing area of technology. While variations of adaptive technologies are known, in some known instances the automatic vehicle mode demonstrates adaptive vehicle dynamics and powertrain mode selection from, for example, sporty, normal, and comfort to enhance the overall driving experience.

However, development of adaptive technologies is still in the early stage and other opportunities to augment known adaptive vehicle systems exist. These advancements may be achieved by leveraging predictive sensing and information capabilities on vehicles to cover more scenarios for improved driver convenience and safety.

The challenge is to develop additional methods that can in real-time predict situations to enhance the automotive mode selection for the vehicle. For example, it is beneficial to have a method that would intelligently select the chassis steering and suspension combination for enhanced maneuverability for a predicted potential collision.

Innovative vehicle technologies provide significant opportunities for enhanced adaptive vehicle systems to meet the needs of tailored vehicle performance and customization.

SUMMARY OF THE INVENTION

The disclosed invention overcomes several of the problems of the prior art by providing an improved method and system in the form of a predictive enhanced maneuverability system including a dedicated module to augment known adaptive vehicle systems. The predictive enhanced maneuverability system according to the disclosed invention provides enhanced timely delivery of vehicle performance selection of chassis, and steering modes for potential predicted safety collisions.

The primary inputs of the disclosed invention include a determination of the proximity to a preceding vehicle, the density of the surrounding traffic, a forward collision warning alert, and the predictive enhanced maneuverability decision sub-system for vehicle mode selection.

The predictive enhanced maneuverability system of the disclosed invention offers several distinct advantages over the known art. Particularly, the system of the disclosed invention provides a customized vehicle dynamics chassis and steering dynamic mode output, based on a predicted decision about vehicle potential for collision, for improved driver maneuverability and safety.

In addition, the disclosed invention provides an improved system and method for incorporating the time dependent headway, forward collision warning alert, and the traffic density for chassis collision-mode embedded decision-making.

The predictive enhanced maneuverability decision-module allows vehicle dynamics mode selection to be tailored based on proximity to potential collision.

When the system of the disclosed invention is in operation, highly predictive risk scenarios from longitudinal situations are given priority for driver safety. In addition, surrounding traffic density computed from environmental sensors including blind spot information systems are leveraged for the traffic density input. Furthermore, the time dependent headway and forward collision warning alert decision-level combination provide additional reliability to ensure reliable mode transition when enhanced vehicle maneuverability is required.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
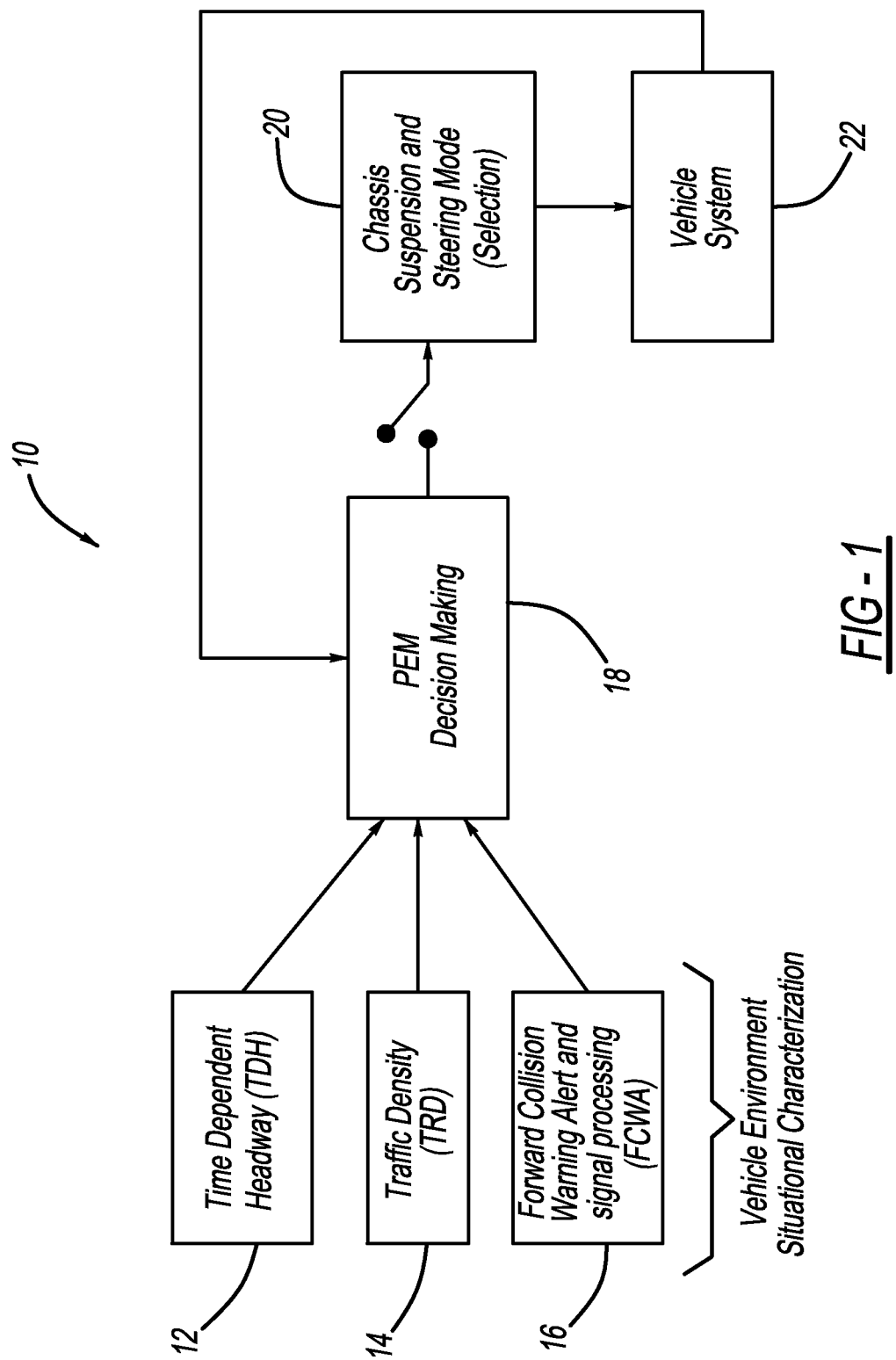
FIG. 1 illustrates a block diagram of the predictive enhanced maneuverability system of the disclosed invention.

In the following figures, the same reference numerals will be used to refer to the same components. In the following description, various operating parameters and components are described for different constructed embodiments. These specific parameters and components are included as examples and are not meant to be limiting.

In general, the disclosed invention provides a tailored, adaptive vehicle system under various vehicle, driver and environment scenarios. The predictive enhanced maneuverability (PEM) system of the disclosed invention intelligently selects the chassis steering and suspension combination for enhanced maneuverability for a predicted potential collision.

Referring to FIG. 1, a block diagram of the predictive enhanced maneuverability decision-making system, generally illustrated as 10, is shown. The predictive enhanced maneuverability decision-making system 10 receives a number of inputs including a time dependent headway (TDH) input 12, a traffic density (TRD) input 14, and a forward collision warning alert (FCWA) input 16. The time dependent headway input 12, the traffic density input 14, and the forward collision warning alert input 16 represent vehicle environment situational characterization.

A predictive enhanced maneuverability decision-making module 18 receives information from the time dependent headway input 12, the traffic density input 14, and a forward collision warning alert input 16 and determines the chassis suspension and steering modes 20. The predictive enhanced maneuverability decision-making module 18 also receives status information from the vehicle system 22. Reliable inputs for the predictive enhanced maneuverability decision module 18 are significant to assure correct mode selection decisions.

The predictive enhanced maneuverability mode selection is executed only during situations when critical countermeasure maneuvers are required to avoid potential collision. The predictive enhanced maneuverability decision-making module may apply a rule-based computational approach to determine the tailored mode selection for potential collision. As shown in FIG. 1, the predictive enhanced maneuverability rule-based sub-system 10 includes a knowledge base and facts for determining the recommended chassis and steering mode 20.

For example, each predictive enhanced maneuverability rule specifies a recommendation of the output chassis mode, and has the IF (condition), THEN (action) structure. When the condition part of a rule is satisfied, the action part is executed. Each rule may specify a recommendation of the output chassis mode (original, normal, sport). Original means the mode is not changed and retains the last mode.

A general rule implemented by the predictive enhanced maneuverability is of the form, $$\{\text{If TDH is } x_i \text{ and TDR is } y_i \text{ and FCWA is } z_i \text{ then chassis mode is } m_i\} \quad (1)$$

$$\{\text{If TDH is } x_i \text{ and TDR is } y_i \text{ and FCWA is } z_i \text{ then suspension mode is } s_i\} \quad (2)$$

The TDH is obtained from recursive computation of the current and mean time dependent headway.

$$TDH_{curr} = \frac{(r_p(k) - r_f(k))}{v_f(k)} \quad (3)$$

where $r_p(k)$ is the position of the preceding vehicle at any time instant k, $r_f(k)$ is the position of the following vehicle and $v_f(k)$ is the velocity of the following vehicle. The mean time dependent headway, $TDH_m(k)$, may be obtained from $$TDH_M(k) = TDH_M(k-1) + \alpha(TDH_{curr} - TDH_M(k-1)) \quad (4)$$

Alpha is chosen to obtain longer-term headway information compared to the forward collision warning alert responds. The forward collision warning alert is obtained from the forward collision warning alert system on certain vehicles. The forward collision warning alert is obtained from $$FCWA = \begin{cases} 1 \cdot z^{-D} & \text{if } FCW \text{ alert is ON} = 1 \\ 0 & \text{otherwise} \end{cases}$$

D is the number of sample delays when the FCW alert is generated.

The delay pipeline is incorporated when the FCW alert is produced to avoid limit cycling should repeated alerts occur and to hold the signal for effective decision-making. By combining the TDH and FCWA in decision-making, increased assurance of predictive close following is obtained for the predictive enhanced maneuverability. The predictive enhanced maneuverability decision-making system then avoids reaction to spurious forward collision warning alerts.

Traffic conditions provided by the TRD is based on information obtained continuously from, for example, a blind spot detection system or side detection system, the following assumptions are made:
(i) traffic density around the operating vehicle is highly correlated with vehicles passing the host vehicle;
(ii) the traffic density is estimated and quantified by signal processing and real-time computation of input signals indicative of cars entering or exiting the blind spot.
The real-time exponential signal generation functions for the left and right sides of the vehicle are given by $$R\_TDE_{new} = ff \cdot R\_TDE_{old} + (1-ff) \cdot y_r \quad (6)$$

$$L\_TDE_{new} = ff \cdot L\_TDE_{old} + (1-ff) \cdot y_l \quad (7)$$

where $R\_TDE_{new}$ and $L\_TDE_{new}$ are the vehicle right side and vehicle left side traffic density estimates, respectively, with values between 0 and 1. $R\_TDE_{old}$ and $L\_TDE_{old}$ are the previous one sample estimates of $R\_TDE_{new}$ and $L\_TDE_{new}$, respectively. The current right and left, blind spot information system (BLIS) alert input signals are given by $y_r$ and $y_l$ respectively, and ff is the exponential forgetting factor. $R\_TDE_{new}$ and $L\_TDE_{new}$ values close to one indicate high traffic density.

The predictive enhanced maneuverability decision-making system 10 of the disclosed invention may play a role in vehicle operation under a number of different collision scenarios. One such situation is illustrated in FIG. 2 in which a potential collision scenario is depicted on a roadway 30 in which a host vehicle 32 is shown in relation to a preceding vehicle 34 and an adjacent vehicle 36.

The host vehicle 32 includes a short-range sensor 38 and a long-range sensor 40. The short-range sensor 38 has a short-range field of view 42 while the long-range sensor 40 has a long-range field of view 44. The host vehicle 32 also includes a first side sensor 46 and a second side sensor 48. The first side sensor 46 has a short-range field of view 50 and the second side sensor 48 has a short-range field of view 52. In operation the short-range sensor 38, the long-range sensor 40, the first side sensor 46 and the second side sensor 48 are active whenever the host vehicle 32 is in operation.

Figure 2:
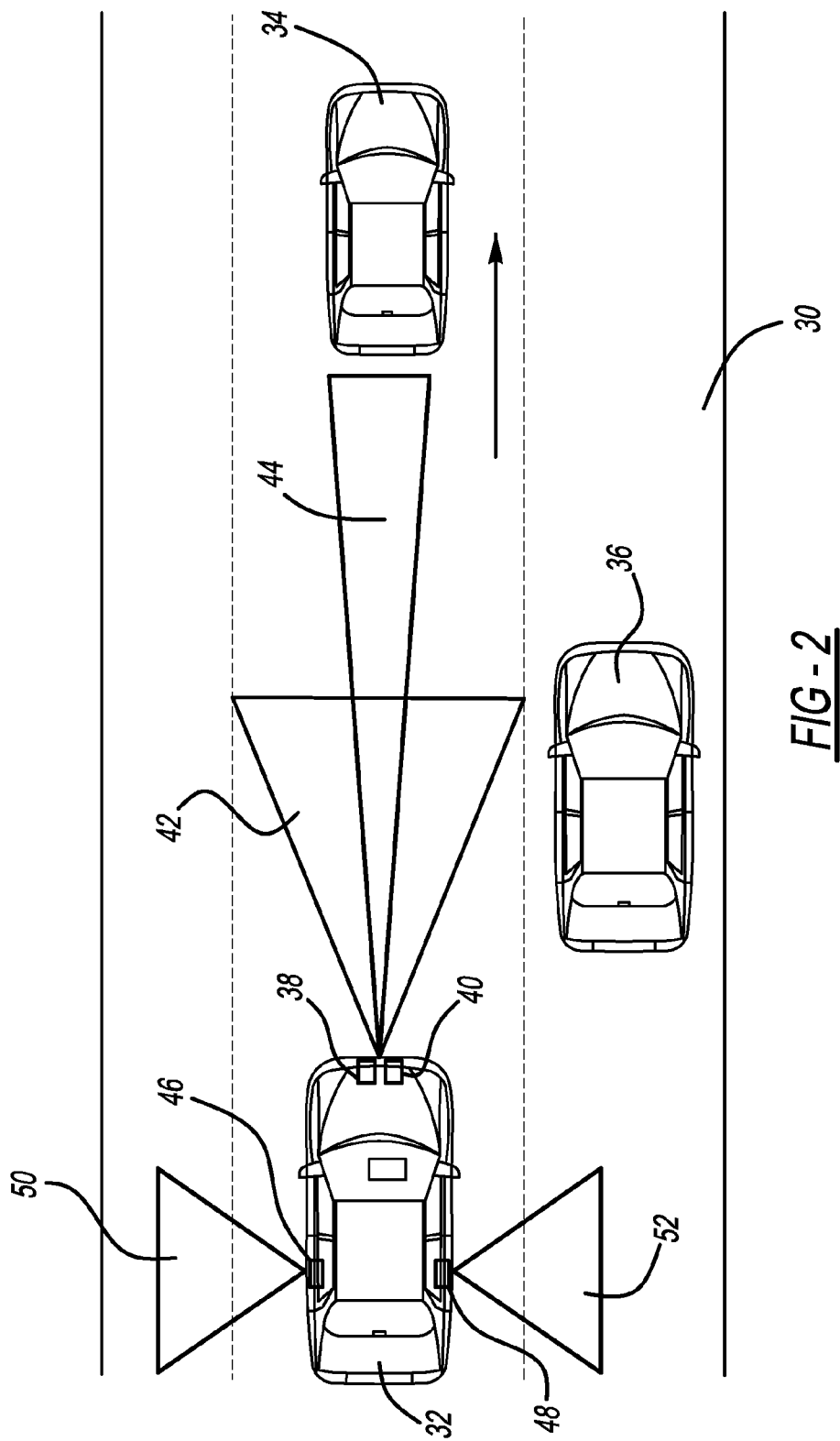
FIG. 2 illustrates a potential collision scenario that may be encountered by a vehicle in which the driver may need to maneuver from the vehicle ahead.

In the scenario illustrated in FIG. 2, the driver of the host vehicle 32 may need to maneuver from the preceding vehicle 34 ahead. The proximity of the preceding vehicle 32 is sensed by the long-range sensor 40 as being within the long-range field of view 44.

With the predictive enhanced maneuverability decision-making system 10 of the disclosed invention identifying a potential collision scenario, if the forward collision warning alert is ON and both the time dependent headway (TDH) and the traffic density (TDR) are low as illustrated in FIG. 2, then both the chassis and the steering are assigned sport mode.

Figure 3:
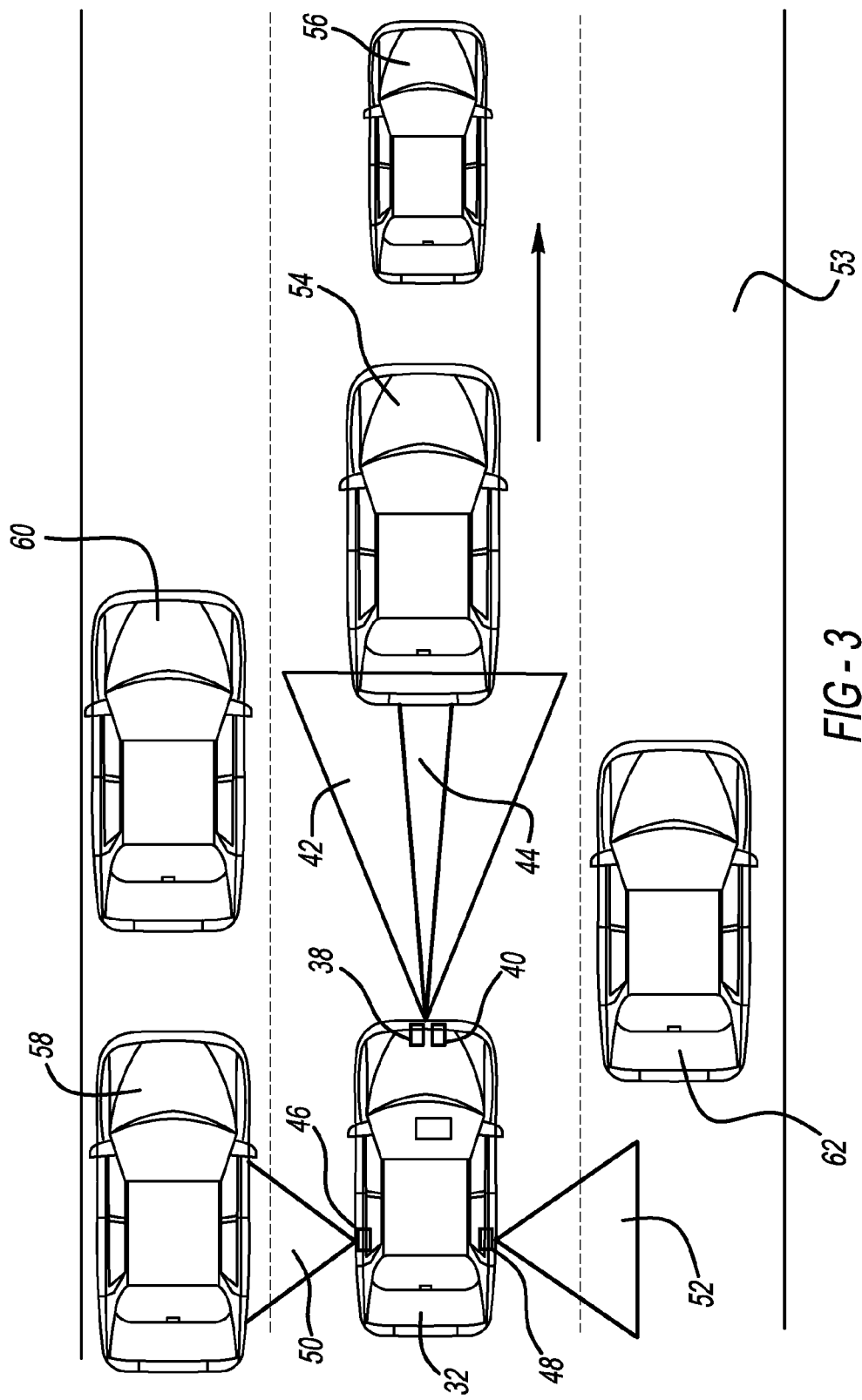
FIG. 3 illustrates a potential collision scenario with traffic that may be encountered by a vehicle in which the driver may need to maneuver from the vehicle ahead.

Another scenario in which the predictive enhanced maneuverability decision-making system 10 of the disclosed invention may play a role in vehicle operation is illustrated in FIG. 3. In this figure, a potential collision scenario is depicted on a roadway 53 in which the host vehicle 32 is shown in relation to a near preceding vehicle 54 and a distant preceding vehicle 56. In addition, adjacent vehicles 58, 60 and 62 are illustrated as being on the roadway 53. As discussed above with respect to FIG. 2, the short-range sensor 38, the long-range sensor 40, the first side sensor 46 and the second side sensor 48 are active whenever the host vehicle 32 is in operation.

The driver of the host vehicle 52 shown in FIG. 3 may need to maneuver from the preceding vehicles 54 and 56 ahead taking into particular consideration the adjacent vehicle 58. In such a potential collision scenario, the relative nearness of the near preceding vehicle 54 is sensed by the short-range sensor 38 while the proximity of the adjacent vehicle 58 is sensed by the first side sensor 46. All of this information is incorporated by the predictive enhanced maneuverability decision-making system 10 of the disclosed invention. If the forward collision warning alert is ON and the time dependent headway (TDH) is low but the traffic density (TDR) is high as illustrated in FIG. 3, then the chassis is in sport mode while the steering is assigned normal mode.

Figure 4:
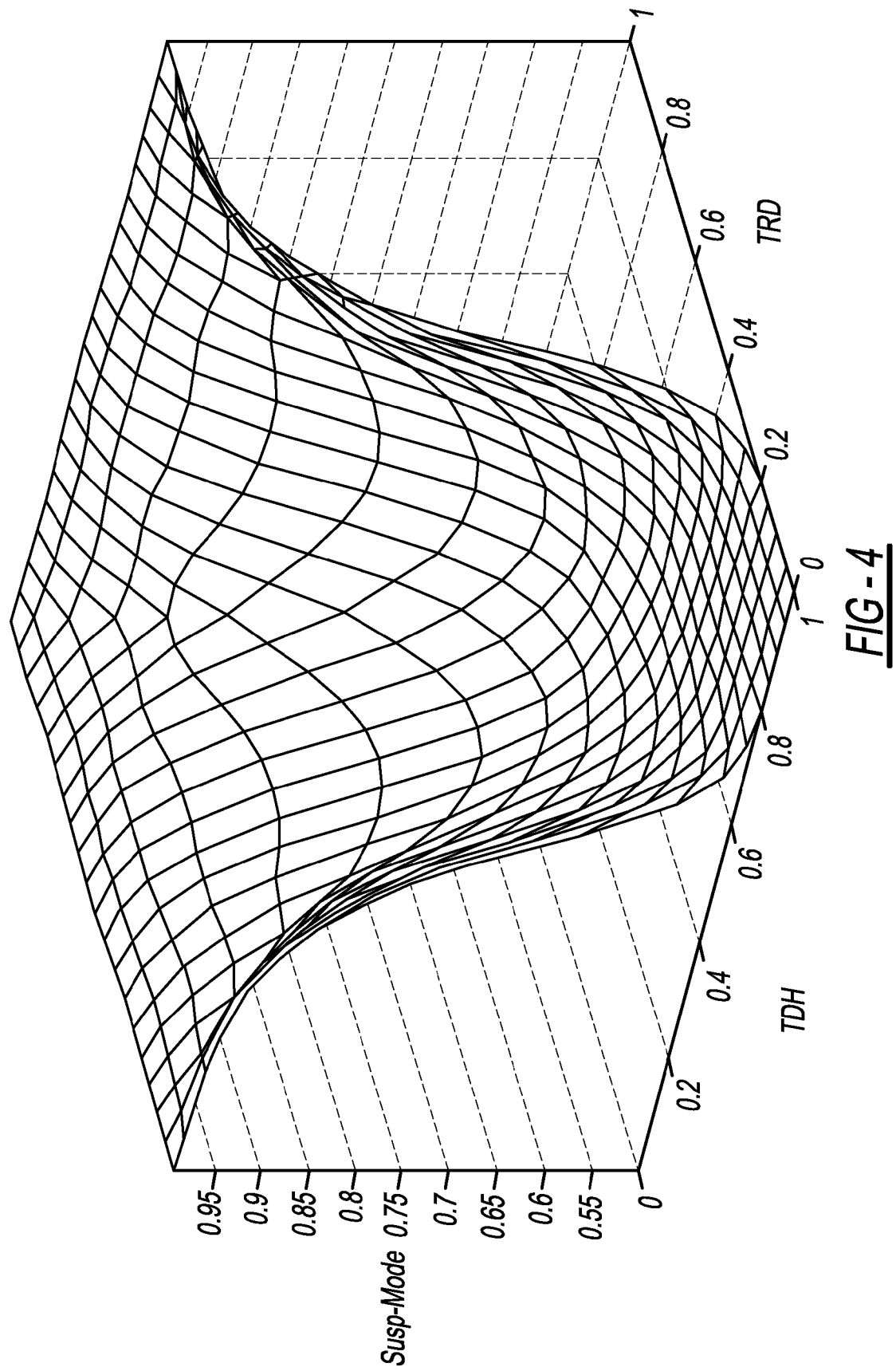
FIG. 4 is a predictive enhanced maneuverability decision-making surface plot depicting normalized suspension mode output.

FIG. 4 illustrates the predictive enhanced maneuverability decision-making surface plot for suspension-mode outputs based on time dependent headway (TDH), traffic density (TRD), and a fixed high forward collision warning alert (FCWA) (1.0). Time dependent headway numbers closer to 0.0 represent situations where the predicted host vehicle time dependent headway is relatively closer to a preceding vehicle, while values closer to 1 represent the vehicle further away from a preceding vehicle. Traffic density values closer to 1 represent predicted higher traffic density.

Accordingly, sport-mode (output >0.7) is selected for the suspension mode when the time dependent headway is low and the traffic density is high for predicted potential collision scenarios.

Figure 5:
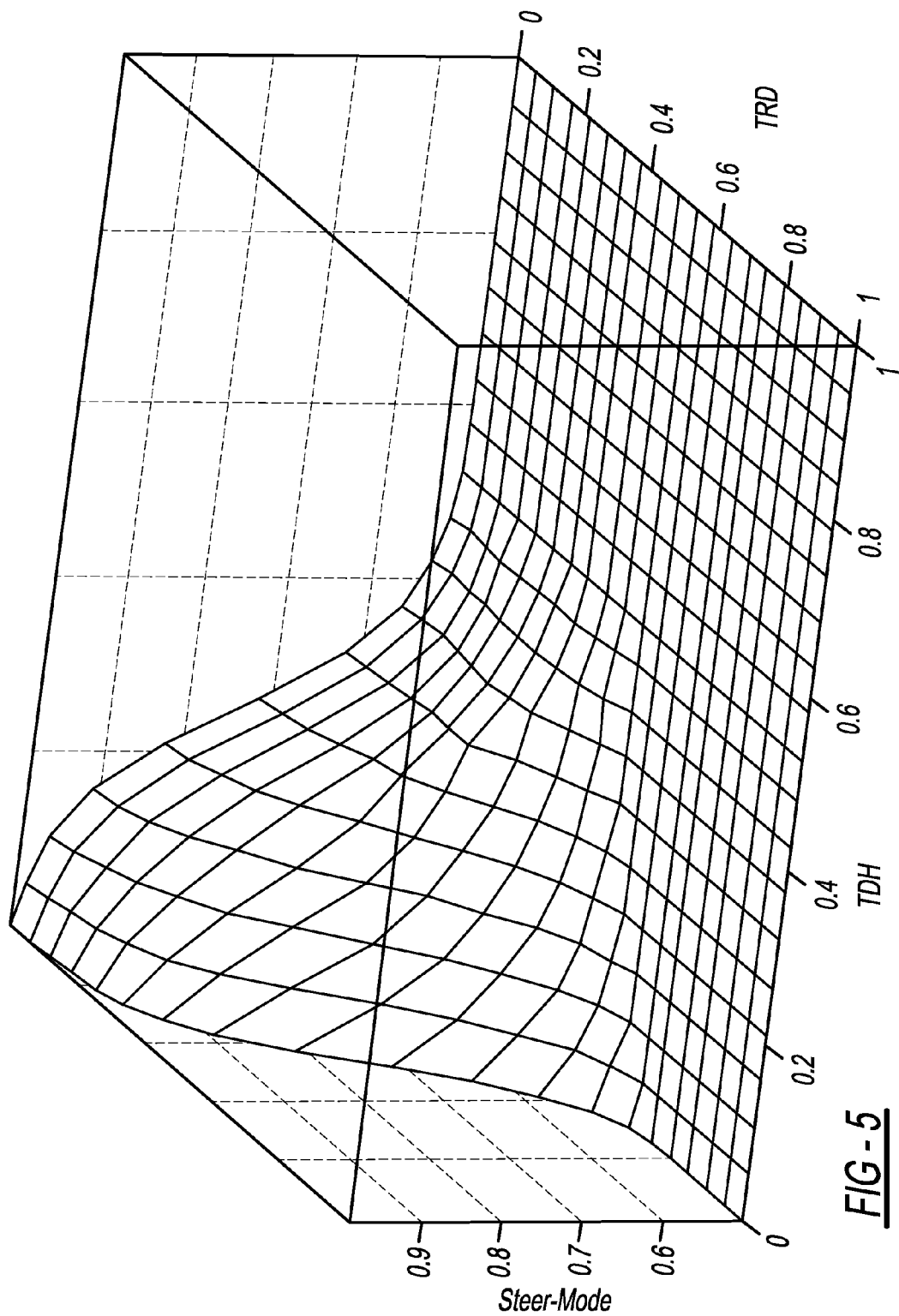
FIG. 5 is a decision making surface plot depicting normalized steering mode output.

FIG. 5 illustrates the predictive enhanced maneuverability decision-making surface plot for steering-mode outputs based on time dependent headway (TDH), traffic density (TRD) and fixed high forward collision warning alert (FCWA) (1.0). Sport steering-mode (steer-mode value >0.7) is selected for predicted potential collisions, when the traffic density is low and the time dependent headway is low. The steering mode is left in the original mode or normal mode if the host vehicle is further away from the preceding vehicle.

The predictive enhanced maneuverability system of the disclosed invention as set forth above provides an intelligent system and means to select chassis steering and suspension combinations for enhanced maneuverability with predicted environmental scenario inputs.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A host vehicle having predictive enhanced maneuverability comprising:
   a suspension having a normal mode and a sport mode;
   a steering system having different operating modes;
   a suspension and steering mode selection module connected with said suspension and said steering system;
   a time dependent headway (TDH) input operatively associated with said module, said TDH being in relation to a preceding vehicle;
   a traffic density (TRD) input operatively associated with said module; and
   a forward collision warning alert (FCWA) input operatively associated with said module, said module having a TDH output algorithm in which, when TDH is closer to 0.0, the host vehicle is identified as being nearer to the preceding vehicle and normal mode is engaged, and, when TDH is closer to 1.0, the host vehicle is farther from the preceding vehicle and sport mode is engaged.

2. The vehicle having predictive enhanced maneuverability of claim 1 wherein said inputs provide information to said module which identifies a potential collision scenario and which determines which of said suspension and steering system operating modes are appropriate for the identified potential collision scenario.

3. The vehicle having predictive enhanced maneuverability of claim 1 wherein said different operating modes of said steering system are selected from a group consisting of at least sport and normal.

4. The vehicle having predictive enhanced maneuverability of claim 1 in which the vehicle has a front portion and in which said front portion includes a short-range sensor and a long-range sensor connected to said module.

5. The vehicle having predictive enhanced maneuverability of claim 4 in which the forward collision warning alert input is generated by said short-range sensor and said long-range sensor.

6. The vehicle having predictive enhanced maneuverability of claim 4 in which the vehicle has a first side and a second side and in which said first side includes a first side sensor and said second side includes a second side sensor.

7. A vehicle having predictive enhanced maneuverability comprising:
   a suspension having original, normal and sport modes;
   a steering system having original, normal and sport modes;
   a suspension and steering mode selection module connected with said suspension and said steering system, said module incorporating a rule-based algorithm;
   a plurality of sensors for distinguishing between low and high time dependent headway (TDH) and for distinguishing between low and high vehicle traffic density (TDR), said sensors being operatively associated with said module, said sensors providing input to said module for selecting among said modes appropriate to respond to a potential collision scenario, whereby when both TDH and TDR are identified as low, said sport mode is selected by said module for both said suspension and said steering system and when said TDH is low and said TDR is high, said sport mode is selected by said module for said suspension and said normal mode is selected for said steering system.

8. The vehicle having predictive enhanced maneuverability of claim 7 wherein said inputs are selected from a group consisting of at least a time dependent headway input, a traffic density input, and a fOrward collision warning alert input.

9. The vehicle having predictive enhanced maneuverability of claim 8 in which the vehicle has a front portion and in which said front portion includes a short-range sensor and a long-range sensor connected to said module.

10. The vehicle having predictive enhanced maneuverability of claim 9 in which the forward collision warning alert input is generated by, said short-range sensor and said long-range sensor.

11. The vehicle having predictive enhanced maneuverability of claim 10 in which the vehicle has a first side and a second side and in which said first side includes a first side sensor and said second side includes a second side sensor.

12. The vehicle having predictive enhanced maneuverability of claim 7 wherein said different operating modes of said suspension are selected from a group consisting of at least sport and normal.

13. The vehicle having predictive enhanced maneuverability of claim 7 wherein said different operating modes of said steering system are selected from a group consisting of at least sport and normal.

14. A method for providing predictive enhanced maneuverability in a host vehicle having a suspension and steering system with different operating modes, the method comprising the steps of:

forming a system including a suspension having sport and normal modes, a steering system having sport and normal modes, a suspension and steering mode decision selection module and a plurality of sensors for determining time dependent headway (TDH), local vehicle traffic density (TRD) and position, said sensors being operatively associated with said decision module and providing input thereto; and assigning a value of TDH of between 0.0 and 1.0, whereby if TDH is closer to 0.0, the host vehicle is identified as being nearer to the preceding vehicle and normal mode is engaged, and, when TDH is closer to 1.0, the host vehicle is farther from the preceding vehicle and sport mode is engaged.

15. The method for providing predictive enhanced maneuverability in a vehicle of claim 14 wherein said inputs are selected from a group consisting of at least a time dependent headway input, a traffic density input, and a forward collision warning alert input, and operating mode selection is made in response to a combination of said inputs.

16. The method for providing predictive enhanced maneuverability in a vehicle of claim 15 in which the vehicle has a front portion and in which said front portion includes a short-range sensor and a long-range sensor connected to said module.

17. The method for providing predictive enhanced maneuverability in a vehicle of claim 16 in which the forward collision warning alert input is generated by said short-range sensor and said long-range sensor.

18. The method for providing predictive enhanced maneuverability in a vehicle of claim 17 in which the vehicle has a first side and a second side and in which said first side includes a first side sensor and said second side includes a second side sensor.

19. The method for providing predictive enhanced maneuverability in a vehicle of claim 14 wherein said different operating modes of said suspension are selected from a group consisting of at least sport and normal and said different operating modes of said steering system are selected from said group consisting of at least sport and normal.

* * * * *